United States Patent
Christen

(10) Patent No.: US 10,611,003 B2
(45) Date of Patent: Apr. 7, 2020

(54) ABRASIVE-MEANS HOLDING DEVICE

(71) Applicant: Robert Bosch GmbH, Stuttgart (DE)

(72) Inventor: Stefan Christen, Worb (CH)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 15/839,360

(22) Filed: Dec. 12, 2017

(65) Prior Publication Data
US 2018/0178355 A1     Jun. 28, 2018

(30) Foreign Application Priority Data

Dec. 28, 2016 (DE) .......................... 10 2016 226 273

(51) Int. Cl.
| | |
|---|---|
| *B24B 1/00* | (2006.01) |
| *B25B 11/00* | (2006.01) |
| *B23Q 11/00* | (2006.01) |
| *B23Q 3/10* | (2006.01) |

(52) U.S. Cl.
CPC .............. *B25B 11/005* (2013.01); *B23Q 3/10* (2013.01); *B23Q 11/0046* (2013.01); *B24B 1/00* (2013.01); *B23Q 11/0071* (2013.01)

(58) Field of Classification Search
CPC ....... B24B 55/06; B24B 55/10; B24B 55/102; B24B 55/105; B24B 1/00; B24B 11/005; B23Q 3/10; B23Q 11/0046
USPC .......................................... 451/344–359, 456
See application file for complete search history.

(56) References Cited

U.S. PATENT DOCUMENTS

| | | | | | |
|---|---|---|---|---|---|
| 3,880,047 | A | * | 4/1975 | Dosier ................... | B23Q 3/069 409/134 |
| 3,932,966 | A | * | 1/1976 | Stern ........................ | B24D 9/08 451/488 |
| 4,058,936 | A | * | 11/1977 | Marton ................. | B24B 55/102 451/359 |
| 4,158,935 | A | * | 6/1979 | Robert ..................... | B24D 9/08 451/359 |
| 4,287,685 | A | * | 9/1981 | Marton .................... | B24D 9/08 451/359 |
| 4,616,449 | A | * | 10/1986 | Marton ................. | B24B 55/102 451/344 |

(Continued)

FOREIGN PATENT DOCUMENTS

EP          3028811 A1 *  6/2016  ........... B24B 55/102

*Primary Examiner* — George B Nguyen
(74) *Attorney, Agent, or Firm* — Maginot, Moore & Beck LLP

(57) ABSTRACT

An abrasive-means holding device for holding an abrasive means includes a holding body that is operable to rotate about a central axis. The holding body has a first side, a second side facing away from the first side, and a vacuuming opening that extends therethrough from the first side to the second side. The holding body also has a group of aspiration cavities that are arranged on the first side and that are fluidically connected to each other by at least one through-hole that connects the aspiration cavities. At least one aspiration cavity forms a vacuuming cavity that is directly fluidically connected to the vacuuming opening and that is configured to vacuum-off dust immediately out of an adjacent aspiration cavity and mediately out of a more distantly adjacent aspiration cavity. The aspiration cavities of the group are arranged in relation to each other along a linear course.

19 Claims, 4 Drawing Sheets

(56) References Cited

U.S. PATENT DOCUMENTS

| | | | | |
|---|---|---|---|---|
| 5,545,080 A * | 8/1996 | Clowers | ............... | B24B 7/184 |
| | | | | 451/354 |
| 5,988,954 A * | 11/1999 | Gaskin | ............... | B23Q 11/0046 |
| | | | | 408/67 |
| 5,993,305 A * | 11/1999 | Chu | ............... | B24B 23/03 |
| | | | | 451/357 |
| 6,050,887 A * | 4/2000 | Chang | ............... | B24B 23/02 |
| | | | | 451/359 |
| 6,780,094 B2 * | 8/2004 | Walker | ............... | B24B 23/04 |
| | | | | 451/356 |
| 7,927,192 B2 * | 4/2011 | Annis | ............... | B24B 7/184 |
| | | | | 15/143.1 |
| D732,917 S * | 6/2015 | Valentini | ............... | D8/70 |
| 10,213,904 B2 * | 2/2019 | Arisawa | ............... | B24D 5/10 |
| 2007/0274798 A1 * | 11/2007 | Benedetti | ............... | B23Q 11/0046 |
| | | | | 409/137 |
| 2008/0207099 A1 * | 8/2008 | Brown | ............... | B24D 9/003 |
| | | | | 451/524 |
| 2009/0181606 A1 * | 7/2009 | Loveless | ............... | B23Q 11/0046 |
| | | | | 451/456 |

* cited by examiner

ABRASIVE-MEANS HOLDING DEVICE

This application claims priority under 35 U.S.C. § 119 to patent application no. DE 10 2016 226 273.4, filed on Dec. 28, 2016 in Germany, the disclosure of which is incorporated herein by reference in its entirety.

BACKGROUND

The disclosure relates to an abrasive-means holding device for holding an abrasive means.

Holders for abrasive means, having a plurality of suction holes for vacuuming-off the abrasion dust produced during operation of the abrasive means, are adequately known from the prior art. The abrasive means may be realized as an exchangeable, flexible sanding disk comprising a base that carries abrasive grits fixed by means of a binder. The abrasive means may be realized so as to be self-adhesive on the side that faces away from the abrasive grits.

SUMMARY

The disclosure is based on the object of improving, by simple design means, an abrasive-means holding device for operating with a hand-held power tool, in particular a power sander.

The object is achieved by an abrasive-means holding device for holding an abrasive means, in particular a self-adhesive and/or flexible abrasive means, in particular for holding a flexible sanding disk, comprising a holding body that can be operated such that it can be rotated about a central axis and that has a first side and a second side facing away from the first side. The holding body has at least one vacuuming opening that extends through the holding body from the first side to the second side thereof. The holding body has at least one group of aspiration cavities that are arranged at least on the first side of the holding body and that are fluidically connected to each other, in each case by means of at least one through-hole that connects the aspiration cavities. At least one, in particular precisely one single aspiration cavity of the group of aspiration cavities forms a vacuuming cavity that, substantially in a direction of flow going from the first side to the second side of the holding body, is directly fluidically connected to the at least one vacuuming opening and that is designed to vacuum-off dust immediately out of an adjacent aspiration cavity and mediately out of a, in relation to the adjacent aspiration cavity, more distantly adjacent aspiration cavity.

According to the disclosure, the aspiration cavities of the group are arranged in relation to each other along a, in particular curved, linear course.

In many cases it is advantageous, or even essential, to vacuum-off the abrasion dust produced during sanding. For this purpose, the abrasion means, in particular the sanding disk, may have one or more vacuuming openings. These may be made, for example, by perforating into a base (for instance of paper or film) that per se does not allow through-flow. Alternatively, it is also possible to use a base of a material that is already permeable per se (for instance a correspondingly realized textile material or an open-celled foam).

The said abrasive-means holding devices are used to fix such sanding disks to a power sander. On the side that faces toward the abrasive means, in some variants these known abrasive-means holding devices have a vinyl film that is grained in the manner of leather, to which the sanding disk can be adhesive-bonded (so-called "PSA pads"). In other variants, the abrasive-means holding devices are realized as so-called "rubber pads", which may also be structured.

To enable dust to be vacuumed-off, the abrasive-means holding devices (in particular the said PSA pads) have, for example, six or seven vacuuming openings that extend fully through the abrasive-means holding devices and through which the abrasion dust can be removed.

In particular, an abrasive-means holding device is to be provided that, in a simple manner, enables dust to be vacuumed-off over as large an area as possible. Moreover, at the same time the abrasive-means holding device is to be as mechanically stable as possible, so as to be capable of withstanding the forces acting during the operation of sanding.

In particular, each of the aspiration cavities is directly or indirectly fluidically connected to at least one vacuuming opening by at least one, preferably precisely one, through-hole. A fluidic connection is understood to mean such a realization in which the abrasion dust can flow, from an aspiration cavity, directly or indirectly through at least one through-hole, in particular at least two, preferably at least three, more preferably at least four or more than four, through-holes, into at least one, in particular precisely one, vacuuming openings. This flow may be amplified by a vacuum generated on the first side of the holding body. Preferably, the aspiration cavities may be fluidically connected to each other substantially in a plane parallel to a lateral face of the first side of the holding body. In particular, in this case the direction of flow of the fluidic connection may be effected substantially toward the central axis of the abrasive-means holding device.

To enable the abrasive means to be held, the first side of the holding body may be realized, for example, such that it is suitable for effecting a hook-and-loop connection and has hooks suitable for this purpose, and/or suitable for clipping-on an abrasive means, and/or suitable for adhering an abrasive means by means of Van der Waals forces (so-called "gecko effect"). As an alternative or in addition to this, the first side of the holding body may be realized such that an adhesive of a pressure-sensitive abrasive means may be temporarily attached thereto.

Since the aspiration cavities are made in the first side of the holding body, they run there into dust inlet openings, through which the abrasion dust that is produced during sanding can enter. The abrasion dust can then flow directly through a vacuuming opening of the holding body. This is possible, in particular, if the aspiration cavity, on the first side of the holding body, runs directly into one of the vacuuming openings of the holding body. Furthermore, the abrasion dust may pass, through at least one through-hole, firstly into at least one other aspiration cavity, from which it can then flow through a vacuuming opening of the holding body.

In particular, the aspiration cavities are arranged on a side of the holding body that faces away from a side in which the at least one vacuuming opening of the holding body is arranged.

Preferably, the first side and the second side of the holding body may be aligned substantially in a level manner and parallel to each other. In particular, in these cases the holding body has a thickness perpendicular to these two sides. Advantageously, this thickness is in the range of from 1 mm to 20 mm, preferably in the range of from 2 mm to 12 mm, particularly preferably in the range of from 3 mm to 6 mm.

Preferably, the holding body may have a support body, in particular realized as a support plate, and an adjusting body that supports the support body and that is in contact, at least partly, with the support body. Alternatively, however, it is also conceivable for the holding body, in particular the support body and the adjusting body, to be realized such that they form a single piece with each other.

The second side of the holding body may have at least one fastening element, by means of which the holding body can be fastened to a drive of a power tool, in particular a power sander. The abrasive-means holding device fastened thus to the power sander can then be used for performing work on a surface by means of a fastened abrasive means.

The holding body may, at least portionally, contain or be composed of, for example, plastic (such as, for instance, PA6,6), metal (such as, for instance, aluminum, glass-fiber reinforced plastic or other composites, and be produced by methods known per se. The holding body may, at least portionally, contain or be composed of foam (such as, for instance, of polyurethane), rubber or other soft or damping plastics.

The design of the holding body according to the disclosure, and in particular the presence of the through-holes, thus allows the abrasion dust on the abrasion side to enter through a multiplicity of dust inlet openings, and consequently it is made possible for dust to be vacuumed-off as uniformly as possible over the entire radial extent of the holding body, without the need for the holding body to comprise a correspondingly high number of vacuuming openings.

For example, the abrasive-means holding device may comprise at least three times, preferably at least four times, more preferably at least five times, and particularly preferably at least six times as many aspiration cavities as vacuuming cavities.

Owing to the multiplicity of aspiration cavities, the abrasive means can be connected, irrespective of its vacuuming openings, to the abrasive-means holding device and a high rate of dust vacuuming can nevertheless be achieved since, owing to the wide radial extent of the aspiration cavities, there is a high probability that the vacuuming openings of the abrasive means overlap the aspiration cavities of the holding body. The number of aspiration cavities may be in the range of from 200 to 10, preferably in the range of from 150 to 20, particularly preferably in the range of from 100 to 30. Numbers in these ranges are particularly suitable, for example, if the abrasive means is realized as a sanding disk having a diameter of 150 mm. The number of vacuuming openings, on the other hand, may be in the range of from 10 to 300, preferably in the range of from 15 to 100, particularly preferably in the range of from 20 to 40.

In order, in particular, to achieve a high flow rate, it may be provided to reduce a number of vacuuming openings in the abrasive-means holding device, and/or at least the cross sections thereof perpendicular to the first side, such that a high flow rate for vacuuming-off abrasion dust can be achieved even if, for example owing to a non-optimal presence of, for example, a radially outer region of the abrasive-means holding device, there is a drop in a suction pressure on the workpiece to be sanded. As a result, the radially inner aspiration cavities can nevertheless overlie a workpiece to be sanded and continue to have a surrounding flow, since air, passing at a high flow rate through the group of aspiration cavities overlying the workpiece, drops is nevertheless drawn at the radially outer aspiration cavities that are no longer overlying the workpiece. Effective vacuuming-off of abrasion dust is thus achieved, and the flow rate is maintained, even in difficult application regions.

At the same time, a cross section parallel to the first side of the holding body of the aspiration cavities is also maximized for intake of abrasion dust, to enable vacuuming-off to be effected over as complete an area as possible, this offering a significant advantage especially in applications with abrasive means having a multiplicity of small vacuuming openings (multi-hole) distributed over the abrasive means, and net-backed abrasive means.

A "through-hole" in this context is to be understood a material through-hole having, in particular, an in particular abrasive primary-forming and/or transforming reduction of the material thickness of a wall of the holding body by, in particular, 100%, and/or an in particular complete a severing of the material thickness of the wall of the holding body.

A "vacuuming cavity" is to be understood to mean an aspiration cavity that, in particular, is realized so as to form a single piece with the vacuuming opening of the holding body or immediately connects this vacuuming opening in such a manner that the aspiration cavity is fluidically connected to the vacuuming opening. The term "central axis" in this case relates to a notional geometric rotation axis of the abrasive-means holding device. A vacuuming opening is intended to be constituted by an opening in the holding body, in particular in the second side of the holding body, that can be connected to a vacuuming device in order to vacuum-off dust that is produced.

The expression "along a linear course" is to be understood to mean that the aspiration cavities are arranged on a line that, in particular, has a radius, in particular a single radius, describing the line. Preferably, the radius of the line may be variable and may increase, at least portionally, in particular in the radial direction of the central axis. Preferably, the radius may describe, in particular, a linear curvature of the linear course.

The linear course may extend, in particular in a plane parallel to the first side and/or parallel to the second side of the holding body, in the circumferential direction, about the central axis, in an angular range of more than 10%, in particular more than 20%, preferably more than 30%, more preferably more than 40%, particularly preferably more than 50%, and in particular less than 180%, preferably less than 120%, more preferably less than 90%, and particularly preferably less than 70%, and be limited thereby.

At least 50%, in particular at least 70%, preferably at least 90%, more preferably 100% of the aspiration cavities of a group may have mid-points of the aspiration cavities that lie on, or are arranged on, the line of the linear course. The linear course may be arranged in a plane parallel to the first and/or the second side of the holding body.

The term "radial extent of the holding body" is to be understood to mean, in particular, an extent going from the central axis of the holding body to a maximal radial extent of the holding body that forms a radius of the holding body.

The term "at least substantially overlap" in this context is to be understood to mean an overlap of a radial extent, in particular of a radius, of the first side of the abrasive-means holding device with aspiration cavities that are fluidically connected to each other and that, starting from a central axis, extend in a range of from 10% to 90%, in particular from 10% to 80%, preferably from 10% to 70%, more preferably from 10% to 60%, particularly preferably from 10% to 50% "Immediately" in this context is to be understood to mean, in particular, directly, such that, for example, a flow connection is effected directly via a through-hole that, in particular, connects the suction cavity to the nearest adjacent, in particular adjoining, aspiration cavity, and is effected with the avoidance of other through-holes through which flow is to be effected, and/or directly via the vacuuming cavity. "Mediately" in this case is to be understood to mean, in particular, indirectly, such that, for example, a flow connection is effected directly via at least two through-holes, in particular connecting the vacuuming cavity to the adjacent aspiration cavities, such that the dust enters through an aspiration cavity, flows into a another aspiration cavity that is adjacent to the latter and is then vacuumed-off immediately from the adjacent vacuuming cavity. A "through-hole" is to be understood to mean, in particular, an "air-flow channel" that is provided for routing an air stream and that, as viewed in the direction of flow, surrounds the air stream, at least portionally, in particular completely. Preferably, a main extent of the air-flow channel is parallel to the direction of flow of the air stream, and at least twice, in particular at least five times, and advantageously at least ten times, longer than at least one cross-sectional extent of the air-flow channel A "direction of flow" is to be understood to mean, in particular, a direction of a net flow, and in particular a direction of a mean mass transport in a flow.

A power tool is a device that has one or more drive motors and possibly one or more transmission mechanisms, and at least one output shaft having—to be understood in the geometric sense—an output axis. Arranged mediately or immediately on the output shaft there is a tool receiving device. The tool receiving device is the component, or components, by which the torque is applied to the tool, the tool receiving device preferably also fixedly holding the tool, in particular in the case of a hand-guided power tool, such that the tool is both fixedly held by, and receives the output torque from, solely the tool receiving device. The term output torque and the terms formed with output mean the torque transmitted from the power tool to the tool, or to the corresponding components of the power tool. The term driving torque denotes the torque received by the tool.

A hand-guided power tool has a carrying means, in particular handles and the like, by means of which the power tool, with the tool fastened thereto, can be guided by an operator. Typically, hand-guided power tools are provided with an electric drive motor, but other designs such as, for example, hydraulically or pneumatically operated power tools, are also known and can be used within the scope of the disclosure. Both a stationary and a non-stationary power tool are suitable as a power tool.

A power tool is a device that has one or more drive motors and possibly one or more transmission mechanisms, and at least one output shaft having—to be understood in the geometric sense—an output axis or central axis. Arranged mediately or immediately on the output shaft there is a tool receiving device. The tool receiving device is the component, or components, by which the torque is applied to the tool, the tool receiving device preferably also fixedly holding the tool, in particular in the case of a hand-guided power tool, such that the tool is both fixedly held by, and receives the output torque from, solely the tool receiving device. The term output torque and the terms formed with output mean the torque transmitted from the power tool to the tool, or to the corresponding components of the power tool. The term driving torque denotes the torque received by the tool.

A hand-held power tool has a carrying means, in particular handles and the like, by means of which the power tool, with the tool fastened thereto, can be guided by an operator. Typically, hand-guided power tools are provided with an electric drive motor, but other designs such as, for example, hydraulically or pneumatically operated power tools, are also known and can be used within the scope of the disclosure. Both a stationary and a non-stationary power tool are suitable as a power tool.

The dependent claims specify further developments of the abrasive-means holding device according to the disclosure.

It may be expedient for the group of aspiration cavities to have at least three, at least four or at least five aspiration cavities, that are arranged at least on the first side of the holding body and that are fluidically connected to each other, in each case by means of at least one through-hole that connects the aspiration cavities.

Further, it may be expedient for the at least one vacuuming opening to overlap at least one vacuuming cavity, in particular in a plane parallel to a lateral face of the first side of the holding body, in such a manner that there is an immediate/direct fluidic connection in a direction of flow going from the first side to the second side. Furthermore, it may be expedient for the at least one vacuuming opening to overlap at least one vacuuming cavity, in particular in a plane parallel to a lateral face of the second side of the holding body, in such a manner that the at least one vacuuming opening is in alignment with the at least one vacuuming cavity. In this way, dust can be vacuumed-off in a uniform manner over a large area.

Furthermore, it may be expedient for the at least one vacuuming opening to overlap at least two vacuuming cavities, in particular in a plane parallel to a lateral face of the second side of the holding body, in such a manner that there is an immediate fluidic connection in a direction of flow going from the first side to the second side. In this way, also, dust can be vacuumed-off in a uniform manner over a large area.

It is proposed that the at least one, in particular each, vacuuming cavity be arranged in a radially inner region of the abrasive-means holding device that, starting from the central axis of the abrasive-means holding device, extends in a range of from 0% to 60%, in particular from 0% to 50%, preferably from 0% to 40%, of a maximum radius of the abrasive-means holding device. The vacuuming cavities may be arranged symmetrically about the central axis and/or equidistantly in relation to the central axis.

It is further proposed that the aspiration cavities of the at least one group, in particular in the radial direction and/or in the circumferential direction of the central axis, be spaced apart from each other. It may be expedient for the holding body to have, between two, in particular between all, mutually adjacent aspiration cavities of the at least one group of aspiration cavities, at least one wall that separates the aspiration cavities and that delimits a maximum radial extent of at least one, in particular each, aspiration cavity. The wall may form a web, which may be designed to support the abrasive means. In particular, the walls, parallel to the first side and/or the second side of the distribution body, may have a thickness in the range of from 1 mm to 5 mm, preferably in the range of from 2 mm to 4 mm, particularly preferably in the range of from 2.5 mm to 3.5 mm. It is understood that not all walls need necessarily have the same thickness. A sanding result can thereby be optimized, in that "sagging" of the abrasive means in an aspiration cavity it minimized, such that the abrasive means is supported over as large an area as possible.

In order to ensure adequate stability of the holding body, advantageously the walls separating the aspiration cavities are not penetrated along the entire thickness of the holding body by the through-holes. It is conceivable, however, and within the scope of the disclosure for the through-holes to penetrate the walls in the region of the first side of the distribution body or even to extend to the second side of the holding body.

It is further proposed that the aspiration cavities, in particular in a plane parallel to a lateral face of the first side of the holding body, be surrounded by 360° by the holding body. The aspiration cavities in this case may have a maximum extent, parallel to the first side of the holding body, that is designed to be open toward the first side of the holding body.

In order to achieve a satisfactory compromise between stability and through-flow capability, the extent of the aspiration cavities, perpendicularly to the first side and/or to the second side of the holding body, and the total thickness of the holding body in this direction may be in the range of from 10% to 70%, preferably in the range of from 10% to 45%, and particularly preferably in the range of from 10% to 25%.

It may be expedient for the aspiration cavities of the at least one group of aspiration cavities to be arranged along a/the linear course that in particular extends around a central axis of the abrasive-means holding device and that is realized as a curved line or spiral line, in particular a Fibonacci spiral line. It is conceivable for the aspiration cavities to follow one another in the form of a chain, such that a homogeneous fluid connection is achieved between the aspiration cavities. These aspiration cavities of the group may be arranged serially in relation to each other in a row. In particular, if the aspiration cavities are arranged in a spiral line, a large extent of the aspiration cavities can be achieved in the radial direction and in the circumferential direction of the central axis, such that vacuuming-off can be effected over a large area in a particularly simple manner.

Furthermore, it may be expedient for at least one, in particular each, aspiration cavity to be elongate, in particular ellipsoidal. In particular, at least one, in particular each, aspiration cavity may have substantially the shape of a cylinder having an ellipsoidal base. The base may be realized, in particular, in a plane that is parallel to the first side, and preferably between the first side and the second side of the holding body, or in the first side of the holding body.

A cylinder in this case is to be understood generally to mean an aspiration cavity delimited by two substantially mutually parallel bases and a circumferential surface. Holding bodies having aspiration cavities in the form of cylinders, in particular straight cylinders, are particularly easy to produce, and also allow effective removal of dust.

In more preferred embodiments, the base may be constituted by a polygon. The polygon may be, in particular, a regular polygon. Quite particularly preferably, the polygon is an equilateral triangle, a square, a regular hexagon or a regular octagon. Alternatively, however, the bases of the cylinder may also be, for example, rectangles, circles or ellipses or also have, for example, the shape of a curved slot.

The elliptical base may have a diameter that is in the range of from 1 mm to 12 mm, preferably in the range of from 2 mm to 10 mm, particularly preferably in the range of from 3 mm to 6 mm. The diameter of the base in this case is understood to mean the diameter of the largest notional circle that contains the base.

Furthermore, it may be expedient for at least two aspiration cavities respectively have two flow openings, of which respectively at least one flow opening is designed to delimit a through-hole of two mutually adjacent aspiration cavities and to form a fluidic connection to the adjacent aspiration cavity.

In particular, the through-hole may be realized in the form of a channel, at least portionally, and be fluidically connected to at least two mutually adjacent aspiration cavities.

The disclosure additionally relates to a power sander for operating an abrasive-means holding device.

The disclosure additionally relates to a sanding system, comprising a power sander, and an abrasive-means holding device designed to be driven with the power sander, and having a sanding disk designed to be fastened to the abrasive-means holding device.

BRIEF DESCRIPTION OF THE DRAWINGS

Further advantages are disclosed by the following description of the drawings. The drawings show exemplary embodiments of the disclosure. The drawings, the description, and the claims contain numerous features in combination. Persons skilled in the art will also expediently consider the features individually and combine them to create appropriate further combinations.

There are shown in.

In the figures, components that are the same are denoted by the same references.

DETAILED DESCRIPTION

Figure 1:
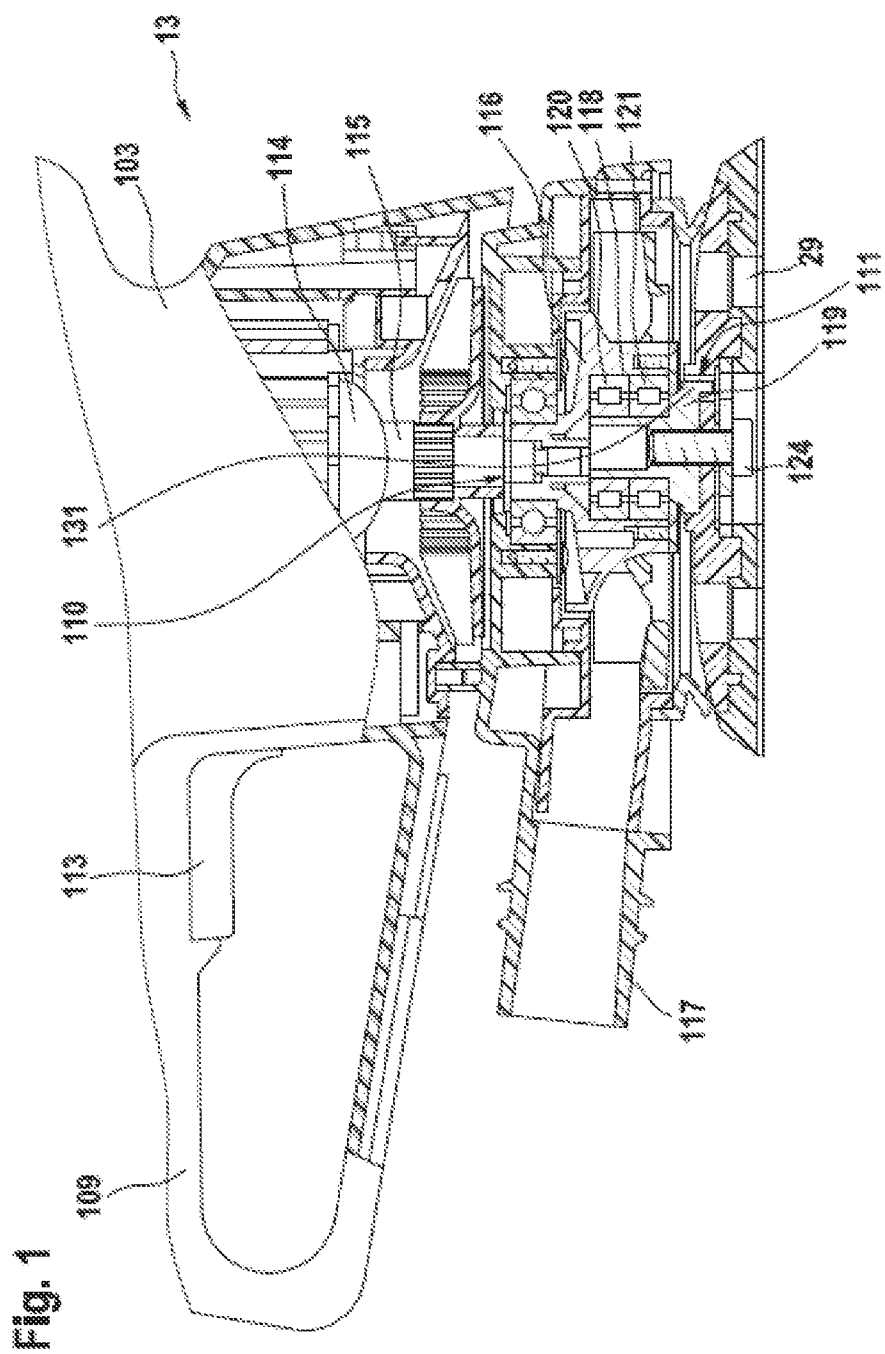
FIG. 1 a sectional view through an exemplary hand-held power tool and an exemplary abrasive-means holding device, FIG. 2 a sectional view through an abrasive-means holding device and through an abrasive means connected to the sanding disk, FIG. 3 a lateral view of the abrasive-means holding device, and FIG. 4 a sectional view through the abrasive-means holding device from FIG. 3.

Represented portionally and partly in section in a lateral view in FIG. 1 is a hand-guided random-orbit power sander 101, referred to in short as a random-orbit sander 101 in the following, for performing sanding work. The random-orbit sander 101 has a housing 103, which, in the direction of viewing, transitions downward into a handle 109, arranged on the underside of which is a switching button 113 for switching on and off an electric motor 114 accommodated inside the housing 103. The random-orbit sander 101 additionally has a drive device 110, comprising at least one output shaft 115 of the electric motor 114, on which shaft there is seated, in a rotationally fixed manner, an impeller 116 of a suction fan, by means of which the abrasion dust that is produced during sanding work on the surface of a workpiece is vacuumed-off and transported, via a blow-out connecting piece, into a dust collecting receptacle. Provided in the hub of the impeller 116 there is a receiving device 111, having an eccentric recess 118, into which there dips a driver 119 that projects on the underside of the housing 103 and that is supported, via two rolling bearings 120, 121, on the inner wall of the eccentric recess. The rotary driving of the driver 119 is effected via the rolling bearings 120, 121, in dependence on the bearing friction. The rolling bearings 120, 121 and the driver 119 are held in an axially non-displaceable manner in the eccentric recess 118. The random-orbit sander 101 is separably connected to an exemplary embodiment of an abrasive-means holding device 13 by means of a fastening screw 124. The random-orbit sander 101 is designed to drive the abrasive-means holding device 13, which can be separably connected to a sanding disk, not shown, for the purpose of applying an abrasive action to a workpiece.

Figure 2:
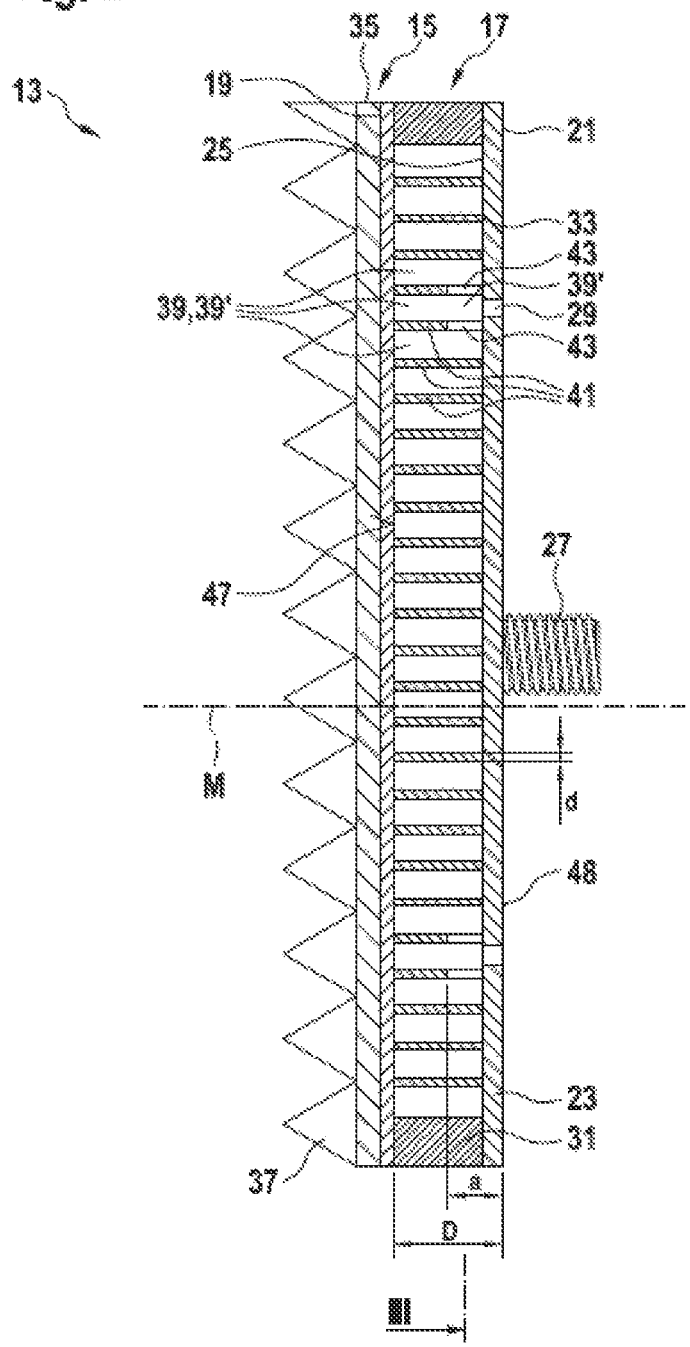

FIG. 2 shows a lateral cross section of an abrasive-means holding device 13 according to the disclosure, with a flexible sanding disk 15 held thereon. The abrasive-means holding device 13 comprises a holding body 17, having a first side 19, and a second side 21 that faces away from the first side. The holding body 17 comprises a support body 23 realized as a support plate, having a first side 25, and a second side 21 that faces away from the first side 25. The first side 25 of the support plate 23 has a fastening element 27, not elaborated further, realized as a fastening thread, by means of which the support plate 23 can be fastened to a receiving device 111 of the random-orbit sander 13. The support plate 23 additionally comprises a plurality of vacuuming openings 29 extending through it from its first side 25 to its second side 21.

The abrasive-means holding device 13 furthermore comprises a distribution body 31, having the first side 19, and a second side 33 that is opposite the first side 19. The second side 33 of the distribution body 31 is connected to the first side 33 of the support plate 21. The second side 33 of the distribution body 31 is designed to hold the sanding disk 15. The abrasive-means holding device 13 may have a geometric central axis M.

The sanding disk 15 comprises a base 35, which may be composed, for example, for a textile material that is permeable to dust. On an upper side of the sanding disk 15 there are abrasive grits 37, fixed by means of a binder that is not represented here. On the opposite, lower, side, the sanding disk 15 has a hook-and-loop layer, not shown in greater detail, which is attached temporarily to the first side 19 of the distribution body 31.

The distribution body 31 additionally comprises a plurality of aspiration cavities 39, 39', which extend through it from its first side 19 to its second side 33, and which are separated from each other by a multiplicity of walls 41. On the first side 19 of the distribution body 31, the aspiration cavities 39, 39' run into dust inlet openings. All vacuuming openings 29 in the support plate 17 are in alignment with respectively one of the aspiration cavities 39' of the distribution body 31 that are realized as vacuuming cavities. Further aspiration cavities 39 are closed off on the first side 19 of the distribution body 31 by the first side 25 of the support plate 17. In order that dust can also be removed from these aspiration cavities 39, some of the walls 41 have a respective through-hole 43, which connects the two adjacent aspiration cavities 39, 39' to each other. In this way, each aspiration cavity 39, 39' is directly or indirectly fluidically connected, by at least one through-hole 43, to at least one vacuuming opening 29 of the support plate 17.

Figure 3:
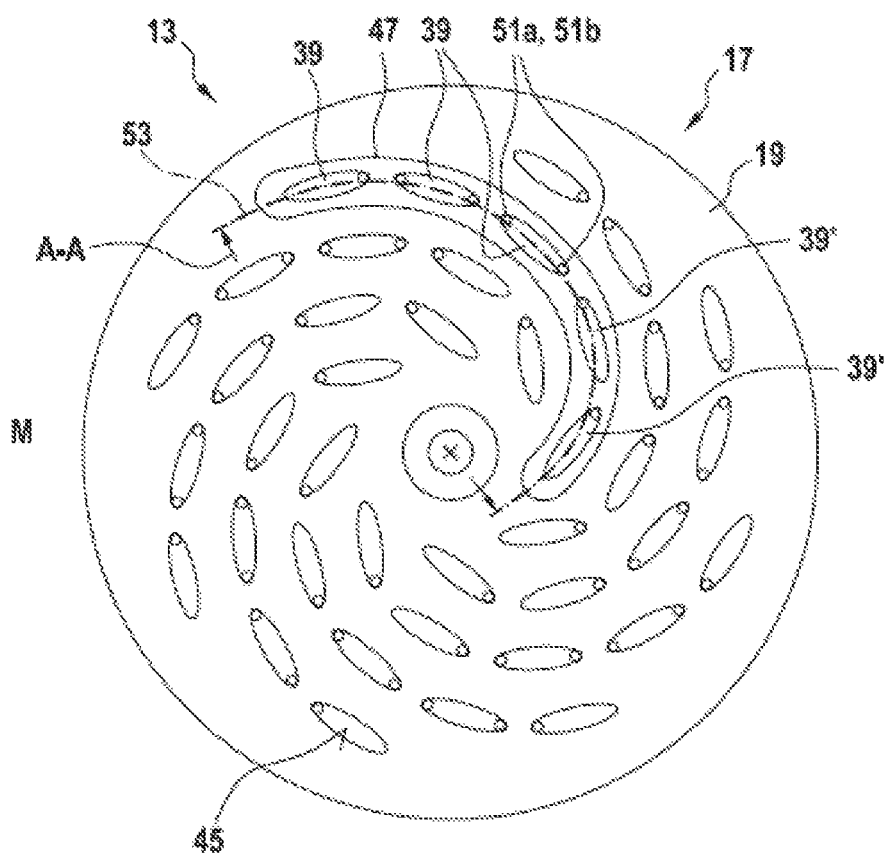

Each aspiration cavity 39, 39' has the shape of a cylinder, having substantially elliptical bases 45 (FIG. 3). Respectively one of the bases 45 of the cylinder is arranged between the first side 19 and the second side 33 of the distribution body 31, the dust inlet openings on the first side 19 having the shape of this base 45. All through-holes 43 extend through the walls 41 only in the region of the first side 19 of the distribution body 31. This arrangement ensures the possibility of a connection surface of the distribution body 31 to the support plate 17, in order to ensure an adhesive connection to the sanding disk 15 that is as stable as possible.

Perpendicularly to its first side 19 and its second side 33, the distribution body 31 has a thickness D, which may be, for example, in the range of from 3 mm to 6 mm. The individual through-holes have an extent a in the range of from 1.5 mm to 3 mm in this direction. The ratio between the extent a of the total thickness D of the distribution body 31 in this case is preferably in the range of from 10% to 55%. Perpendicularly to this direction (i.e. parallel to the first side 19 and to the second side 33 of the distribution body 31), the walls 41 have a thickness d, which may be, for example, in the range of from 2.5 mm to 3.5 mm.

The support plate 17 may be composed, for example, of plastic such as, for instance PA6,6. The distribution body 31 may be composed, for instance of a polyurethane foam and be fastened to the support plate 17, for example, by being sprayed onto the latter, as described in yet greater detail further below.

Abrasion dust that is produced during sanding can first enter the aspiration cavities 39, 39' through the sanding disk 15. The abrasion dust can escape from the aspiration cavities 39', which are in alignment with the vacuuming openings 29, directly through this vacuuming opening 29. From the other aspiration cavities 39, the abrasion dust can pass, through one or more through-holes 43, into an aspiration cavity 39', which is aligned such that it is directly fluidically connected to the aspiration cavity 39' and to a vacuuming opening 29. In this way, removal of dust is effected over a large area, even although the vacuuming openings 29 are not distributed over the entire support plate 17.

The aspiration cavities 39, 39' are arranged in groups 47. The aspiration cavities 39, 39' of a group 47 are fluidically connected. In this embodiment, each group 47 has a vacuuming cavity 39' that, in a plane parallel to a lateral face 49 of the first side 19 of the holding body 17, overlaps with the vacuuming openings 29 of the support plate 17 in such a manner that there is an immediate, or direct, fluidic connection in a direction of flow going from the first side 19 to the second side 33. Each vacuuming cavity 39' of the distribution body 31 is in alignment with a vacuuming opening 29 of the support plate 17.

At least one vacuuming opening 29 overlaps at least two vacuuming cavities 39', in a plane parallel to the second side 21 of the holding body 17, in such a manner that there is an immediate, or direct, fluidic connection in a direction of flow going from the first side 19 to the second side 33 of the holding body 17.

The vacuuming cavities 39' are arranged in a radially inner region of the abrasive-means holding device 13 that, starting from the central axis M of the abrasive-means holding device 13, extends in a range of from 10% to 60% of a maximum radius of the abrasive-means holding device 13. In a plane parallel to a lateral face 49 of the first side 19 of the holding body 17, the aspiration cavities 39, 39' are surrounded by 360° by the distribution body 31, and are designed so as to be open toward the first side 19 of the distribution body 31.

FIG. 3 shows a view of the first side 19 of the holding body 17. Clearly shown are the vacuuming cavities 39', which extend through the holding body 17 from a first side 19 to a second side 33, and which are provided for vacuuming-off the abrasion dust through the vacuuming opening 29 of the support plate 17. The vacuuming cavity 39 in this case is fluidically connected to three aspiration cavities 39 of the group that are adjacent to and spaced apart from the vacuuming cavity 39'. The aspiration cavities 39, 39' of the groups are spaced apart from each other in the radial direction and in the circumferential direction of the central axis M.

FIG. 3 shows eight groups 47 of aspiration cavities 39, 39'. Each group 47 of aspiration cavities 36, 36' has five aspiration cavities 36, 36', realized so as to be open toward the first side 19 of the distribution body 31. The aspiration cavities 39, 39' are fluidically connected to each other, in each case by means of at least one through-hole 43 connecting the aspiration cavities 39, 39'. The aspiration cavities 39, 39' are elongate and ellipsoidal.

At least two aspiration cavities 39, 39' have respectively two flow openings 51a, 51b, of which respectively at least one flow opening 51a, 51b is provided to delimit a through-hole 43 of two mutually adjacent aspiration cavities 39, 39' and to form a fluidic connection to the adjacent aspiration cavities 39, 39'.

The aspiration cavities 39, 39' of the at least one group 47 of aspiration cavities 39, 39' are arranged along a linear course 53 that extends around a central axis M of the abrasive-means holding device 13 and that is realized as a curved line or spiral line, in particular a Fibonacci spiral line. The aspiration cavities 39, 39' follow one another in the form of a chain, such that a homogeneous fluid connection is achieved between the aspiration cavities 39, 39'. These aspiration cavities 39, 39' of the group 47 are arranged serially in relation to each other in a row. In particular, if the aspiration cavities 39, 39' are arranged in a linear course 53, a large extent of the aspiration cavities 39, 39' can be achieved in the radial direction and in the circumferential direction of the central axis M, such that vacuuming-off can be effected over a large area in a particularly simple manner.

Figure 4:
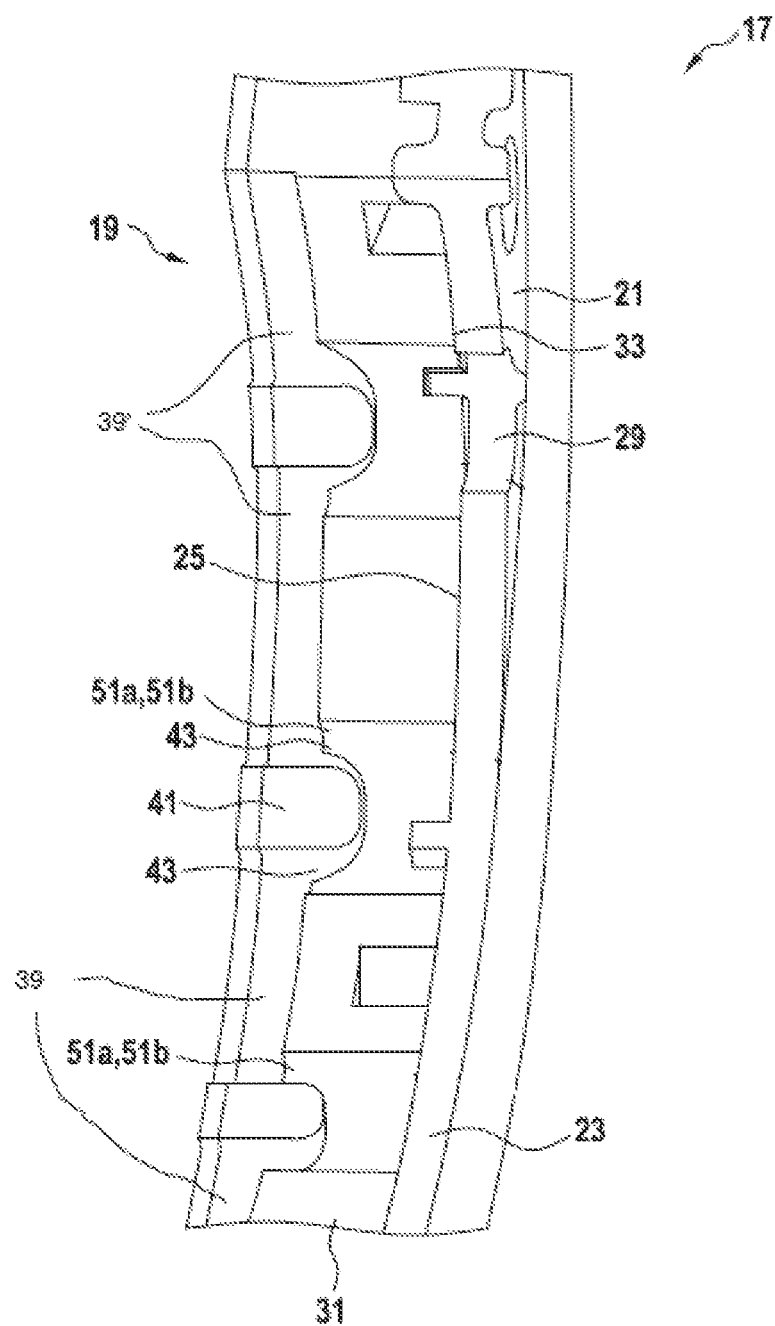

FIG. 4 shows a section through the abrasive-means holding device of FIG. 3 the second side 34 of a distribution body 30 in a first embodiment of the abrasive-means holding device 10. Here, the aspiration cavities 36 have the shape of a cylinder, having an ellipse as a base 45. These aspiration cavities 39, 39' are separated from each other by walls 38. In this way, a type of mutually assigned aspiration cavities 39, 39' is produced, which extend anti-clockwise in the form of a chain in the radial direction and in the circumferential direction, in a as viewed in the radial direction from the central axis M, and form a group 47 of aspiration cavities 39, 39'. As a result, on the one hand the aspiration cavities 39, 39' are extremely stable, and on the other hand they allow an extremely uniform removal of dust. The aspiration cavities 39' denoted by 36' form vacuuming cavities, and are in alignment with vacuuming openings 29 of the support plate 17. Thus, at these points, it is possible to see through both the distribution body 31 and the support plate 17 arranged behind the latter. The rest of the aspiration cavities 39 (only some of which are denoted) are not in alignment with the vacuuming openings 29 of the support plate 17. Thus, at these points, it is not possible to see through the aspiration cavities 39, 39' to the second side 21 of the support plate 17.

Represented in FIG. 4 is a sectional view relating to the example from FIG. 3, along the linear course A-A. The through-holes 43, which extend through some of the walls 41, can be seen here. In this way, the aspiration cavities 39, 39' are directly fluidically connected to one of the vacuuming opening 29, whereas the aspiration cavities 39, 39' (of which, here likewise, only some are denoted by references) are indirectly fluidically connected, through at least one through hole 43, to at least one aspiration cavity 39, 39', and consequently to one vacuuming opening 29. Between all mutually adjacent aspiration cavities 39, 39' of a group 47 of aspiration cavities 39, 39', the holding body 17 has at least one wall 41 that separates the aspiration cavities 39, 39' and that delimits a maximum radial extent of at least each aspiration cavity 39, 39'.

Alternatively, however, it is also conceivable and within the scope of the disclosure that, other than as shown in FIG. 2 and FIG. 3, each aspiration cavity 36, 36' is in alignment with a vacuuming opening 26.

What is claimed is:

1. An abrasive-means holding device for holding an abrasive means, comprising:
   a holding body configured to be rotated about a central axis, the holding body having:
      a first side and a second side facing away from the first side,
      at least one vacuuming opening that extends through the holding body from the first side to the second side thereof, and
      at least one group of aspiration cavities that are arranged at least on the first side of the holding body and that are fluidically connected to each other in each case by at least one through-hole that connects the aspiration cavities,
   wherein at least one aspiration cavity forms a vacuuming cavity that, substantially in a direction of flow going from the first side to the second side of the holding body, is directly fluidically connected to the at least one vacuuming opening and that is configured to vacuum-off dust immediately out of an adjacent aspiration cavity and mediately out of a, in relation to the adjacent aspiration cavity, more distantly adjacent aspiration cavity, and
   wherein the aspiration cavities of the group are arranged in relation to each other along a linear course and, in a plane parallel to a lateral face of the first side of the holding body, are surrounded by 360° by the holding body.

2. The abrasive-means holding device according to claim 1, wherein the group of aspiration cavities has at least three aspiration cavities that are arranged at least on the first side of the holding body and that are fluidically connected to each other in each case by at least one through-hole that connects the aspiration cavities.

3. The abrasive-means holding device according to claim 1, wherein the at least one vacuuming opening overlaps at least one vacuuming cavity, in a plane parallel to a lateral face of the first side of the holding body, such that there is an immediate/direct fluidic connection in a direction of flow going from the first side to the second side, and the at least one vacuuming opening is in alignment with the at least one vacuuming cavity.

4. The abrasive-means holding device according claim 1, wherein the at least one vacuuming opening overlaps at least two vacuuming cavities, in a plane parallel to a lateral face of the second side of the holding body, such that there is a direct fluidic connection in a direction of flow going from the first side to the second side.

5. The abrasive-means holding device according to claim 1, wherein the at least one vacuuming cavity is arranged in a radially inner region of the abrasive-means holding device that, starting from the central axis of the abrasive-means holding device, extends in a range of from 0% to 60% of a maximum radius of the abrasive-means holding device.

6. The abrasive-means holding device according to claim 1, wherein the aspiration cavities of the at least one group are spaced apart from each other.

7. The abrasive-means holding device according to claim 1, wherein the holding body has, between two mutually adjacent aspiration cavities of the at least one group of aspiration cavities, at least one wall that separates the aspiration cavities and that delimits a maximum radial extent of at least one aspiration cavity.

8. The abrasive-means holding device according to claim 1, wherein the linear course extends around a central axis of the abrasive-means holding device and that is configured as a curved line or a spiral line.

9. The abrasive-means holding device according to claim 1, wherein at least one aspiration cavity is elongate.

10. The abrasive-means holding device according to claim 1, wherein at least two aspiration cavities respectively have two flow openings, of which respectively at least one flow opening is configured to delimit a through-hole of two mutually adjacent aspiration cavities and to form a fluidic connection to the adjacent aspiration cavity.

11. A power sander, comprising:
an abrasive-means holding device configured to hold an abrasive means, the abrasive-means holding device including:
  a holding body configured to be rotated about a central axis, the holding body having:
    a first side and a second side facing away from the first side,
    at least one vacuuming opening that extends through the holding body from the first side to the second side thereof, and
    at least one group of aspiration cavities that are arranged at least on the first side of the holding body and that are fluidically connected to each other in each case by at least one through-hole that connects the aspiration cavities,
  wherein at least one aspiration cavity forms a vacuuming cavity that, substantially in a direction of flow going from the first side to the second side of the holding body, is directly fluidically connected to the at least one vacuuming opening and that is configured to vacuum-off dust immediately out of an adjacent aspiration cavity and mediately out of a, in relation to the adjacent aspiration cavity, more distantly adjacent aspiration cavity, and
  wherein the aspiration cavities of the at least one group are arranged in relation to each other along a linear course that extends around a central axis of the abrasive-means holding device and that is configured as a curved line or a spiral line.

12. A sanding system, comprising:
a power sander;
an abrasive-means holding device configured to be driven with the power sander, the abrasive-means holding device including:
  a holding body configured to be rotated about a central axis, the holding body having:
    a first side and a second side facing away from the first side,
    at least one vacuuming opening that extends through the holding body from the first side to the second side thereof, and
    at least one group of aspiration cavities that are arranged at least on the first side of the holding body and that are fluidically connected to each other in each case by at least one through-hole that connects the aspiration cavities, and
  wherein at least one aspiration cavity forms a vacuuming cavity that, substantially in a direction of flow going from the first side to the second side of the holding body, is directly fluidically connected to the at least one vacuuming opening and that is configured to vacuum-off dust immediately out of an adjacent aspiration cavity and mediately out of a, in relation to the adjacent aspiration cavity, more distantly adjacent aspiration cavity, and
  wherein the aspiration cavities of the group are arranged in relation to each other along a linear course; and
a sanding disk configured to be fastened to the abrasive-means holding device.

13. The abrasive-means holding device according to claim 1, wherein the abrasive-means holding device is configured to hold one or more of a self-adhesive abrasive means and a flexible abrasive means or to hold a flexible sanding disk.

14. The abrasive-means holding device according to claim 1, wherein the at least one aspiration cavity that forms the vacuuming cavity is precisely one single aspiration cavity.

15. The abrasive-means holding device according to claim 5, wherein each vacuuming cavity is arranged in the radially inner region of the abrasive-means holding device.

16. The abrasive-means holding device according to claim 6, wherein the aspiration cavities of the at least one group are spaced apart from each other in one or more of the radial direction and the circumferential direction of the central axis.

17. The abrasive-means holding device according to claim 1, wherein the holding body has, between all mutually adjacent aspiration cavities of the at least one group of aspiration cavities, at least one wall that separates the aspiration cavities and that delimits a maximum radial extent of each aspiration cavity.

18. The abrasive-means holding device according to claim 8, wherein the linear course is configured as a Fibonacci spiral line.

19. The abrasive-means holding device according to claim 1, wherein each aspiration cavity is elongate.

* * * * *